(12) United States Patent
Uematsu et al.

(10) Patent No.: US 11,349,563 B2
(45) Date of Patent: May 31, 2022

(54) COMMUNICATION MONITOR METHOD AND COMMUNICATION MONITOR DEVICE

(71) Applicant: Nippon Telegraph and Telephone Corporation, Tokyo (JP)

(72) Inventors: Takui Uematsu, Tokyo (JP); Hiroyuki Iida, Tokyo (JP); Hidenobu Hirota, Tokyo (JP); Naotsugu Ambe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/424,230

(22) PCT Filed: Jan. 15, 2020

(86) PCT No.: PCT/JP2020/001002
§ 371 (c)(1),
(2) Date: Jul. 20, 2021

(87) PCT Pub. No.: WO2020/158383
PCT Pub. Date: Jun. 8, 2020

(65) Prior Publication Data
US 2022/0116109 A1    Apr. 14, 2022

(30) Foreign Application Priority Data
Jan. 29, 2019   (JP) .............................. JP2019-013567

(51) Int. Cl.
*H04B 10/077*   (2013.01)
(52) U.S. Cl.
CPC ................................ *H04B 10/0773* (2013.01)
(58) Field of Classification Search
None
See application file for complete search history.

(56) References Cited

U.S. PATENT DOCUMENTS

2007/0242954 A1*  10/2007  Sackman ........... H04B 10/0793
                                                         398/71

FOREIGN PATENT DOCUMENTS

JP    2008148272 A   *  6/2008
JP    2009177510         8/2009
(Continued)

OTHER PUBLICATIONS

[No Author Listed], "Basic Skills Development Course," NTT Technology Journal, Sep. 2005, pp. 91-94, 9 pages (With English Translation).

*Primary Examiner* — David W Lambert
(74) *Attorney, Agent, or Firm* — Fish & Richardson P.C.

(57) ABSTRACT

Provided are a communication monitoring method and a communication monitoring apparatus capable of an operation of identifying a coated optical fiber regardless of a propagation direction of an optical signal even before communication between an OLT and an ONU is opened.

The communication monitoring apparatus according to the present invention includes: an optical signal detection unit 31 configured to receive, as a received signal, at least one of a downlink optical signal transmitted from an OLT 21 or an uplink optical signal transmitted from an ONU 22; and a signal analysis unit 32 configured to detect a signal type and unique information of a transmission source from information included in the received signal, determine whether the received signal is the downlink optical signal or the uplink optical signal on the basis of the signal type, and determine that the unique information of the transmission source is unique information of the OLT when the received signal is the downlink optical signal and that the unique information of the transmission source is unique information of the ONU when the received signal is the uplink optical signal.

8 Claims, 2 Drawing Sheets

(56) References Cited

FOREIGN PATENT DOCUMENTS

| | | | |
|---|---|---|---|
| JP | 2009177510 A | * | 8/2009 |
| JP | 2013120117 A | * | 6/2013 |
| JP | 2014013967 A | * | 1/2014 |
| JP | 2014121009 A | * | 6/2014 |
| JP | 2015132775 | | 7/2015 |
| JP | 2017135461 A | * | 8/2017 |

* cited by examiner

COMMUNICATION MONITOR METHOD AND COMMUNICATION MONITOR DEVICE

CROSS-REFERENCE TO RELATED APPLICATIONS

This application is a National Stage application under 35 U.S.C. § 371 of International Application No. PCT/JP2020/001002, having an International Filing Date of Jan. 15, 2020, which claims priority to Japanese Application Serial No. 2019-013567, filed on Jan. 29, 2019. The disclosure of the prior application is considered part of the disclosure of this application, and is incorporated in its entirety into this application.

TECHNICAL FIELD

The present disclosure relates to a communication monitoring method and a communication monitoring apparatus in an optical access network system.

BACKGROUND ART

A communication monitoring apparatus is disclosed which receives an uplink optical signal transmitted from an optical network unit (ONU) to an optical line terminal (OLT) among control frames standardized by IEEE 802.3ah, which is a standard of Gigabit Ethernet (trade name)—passive optical network (GE-PON), detects a control frame from the optical signal, and acquires unique information (such as media access control (MAC) address) of the ONU included in the control frame (for example, see PTL 1).

There is also disclosed a method of bending a coated optical fiber, leaking, from the bended portion, an uplink optical signal transmitted from the ONU, and acquiring a MAC address by the communication monitoring apparatus (for example, see PTL 2). Such a communication monitoring apparatus can identify a coated optical fiber without using coated optical fiber identification light by comparing the acquired MAC address of the ONU with the MAC address of the ONU actually used by a user.

CITATION LIST

Patent Literature

PTL 1: JP 2009-177510 A
PTL 2: JP 2015-132775 A

Non Patent Literature

Non Patent Literature 1: Technical Basic Course (GE-PON Technology) the 2nd IEEE 802.3ah Technical Standard, NTT Technical Journal, 2005. 9.

SUMMARY OF THE INVENTION

Technical Problem

In the methods disclosed in PTLs 1 and 2, it is necessary to acquire the uplink light from the ONU, and thus the coated optical fiber can be identified only while the communication service is in use, that is, in a state where communication is performed between the OLT and the ONU. On the other hand, in a state where the OLT and the ONU are not in communication (for example, when a communication line is not opened yet and is unconnected or when the ONU is powered off), the uplink light from the ONU is not transmitted, and thus the coated optical fiber cannot be identified.

The OLT transmits downlink light even when not performing communication with the ONU. Therefore, for example, when a control frame can be detected from a downlink optical signal transmitted from the OLT, and unique information (such as a MAC address) of the OLT included in the control frame can be acquired, the coated optical fiber can be identified without use of coated optical fiber identification light by comparing the acquired unique information with the MAC address of the OLT even in a state where the OLT and the ONU are not in communication.

FIG. 1 is a diagram illustrating an example of a communication monitoring apparatus. Communication monitoring apparatuses (11 and 12) receive a downlink optical signal transmitted from an OLT 21 and an uplink optical signal transmitted from an ONU via an optical branch unit 13 (for example, an optical branching coupler and an optical fiber local-light coupling device) provided in an optical fiber transmission line 23 between the OLT 21 and the ONU 22, and acquire MAC addresses of the OLT 21 and the ONU 22 from a control frame of the received signal.

The communication monitoring apparatus 11 is, for example, a communication monitoring apparatus for uplink optical signals described in PTL 1. The communication monitoring apparatus 11 acquires the MAC address of the ONU 22 from the uplink optical signal. The communication monitoring apparatus 12 is a communication monitoring apparatus for downlink optical signals. The communication monitoring apparatus 12 acquires the MAC address of the OLT 21 from the downlink optical signal in a manner similar to that of PTL 1. FIG. 1 illustrates an example in which the optical fiber transmission line 23 is one coated optical fiber. However, in an actual work site (for example, a closure), a large number of coated optical fibers are laid, and an operator needs to take out one of the coated optical fibers on which an operation is to be performed. In a case where the optical fiber local-light coupling device is used as the optical branch unit 13, the operator needs to determine directions in which the uplink optical signal and the downlink optical signal propagate within the coated optical fiber, determines from which port of the optical branch unit 13 the uplink optical signal or the downlink optical signal is output, and differentiates and connects the communication monitoring apparatus (11 or 12) corresponding to each port. Therefore, the operation of identifying the coated optical fiber in the related art has poor operation efficiency and has a problem that erroneous detection occurs in a case where the propagation directions of the uplink optical signal and the downlink optical signal cannot be determined or are erroneously determined.

In this regard, in order to solve the problems described above, an object of the present invention is to provide a communication monitoring method and a communication monitoring apparatus capable of an operation of identifying a coated optical fiber regardless of a propagation direction of an optical signal even before communication between an OLT and an ONU is opened.

Means for Solving the Problem

In order to achieve the object described above, a communication monitoring method according to the present invention includes detecting a control frame propagating through an optical fiber transmission line, determining whether the control frame is an uplink frame or a downlink frame on the basis of a type of the control frame, and acquiring unique information of an OLT or an ON U from transmission source identification information included in the control frame.

Specifically, the communication monitoring method according to the present invention is a communication monitoring method of monitoring communication between an optical line terminal (OLT) and a plurality of optical network units (ONUs) connected via an optical fiber transmission line, the method including:

receiving, as a received signal, at least one of a downlink optical signal transmitted from the OLT or an uplink optical signal transmitted from each of the ONUs;

detecting a signal type and unique information of a transmission source from information included in the received signal;

determining whether the received signal is the downlink optical signal or the uplink optical signal based on the signal type; and determining that the unique information of the transmission source is unique information of the OLT when the received signal is the downlink optical signal and that the unique information of the transmission source is unique information of the ONU when the received signal is the uplink optical signal.

A communication monitoring apparatus according to the present invention is a communication monitoring apparatus configured to monitor communication between an optical line terminal (OLT) and a plurality of optical network units (ONUs) connected via an optical fiber transmission line, the apparatus including:

a single or two optical signal detection units configured to receive, as a received signal, at least one of a downlink optical signal transmitted from the OLT or an uplink optical signal transmitted from each of the ONUs; and a signal analysis unit configured to:

detect a signal type and unique information of a transmission source from information included in the received signal;

determine whether the received signal is the downlink optical signal or the uplink optical signal based on the signal type; and determine that the unique information of the transmission source is unique information of the OLT when the received signal is the downlink optical signal and that the unique information of the transmission source is unique information of the ONU when the received signal is the uplink optical signal.

The control frame propagates through the optical fiber transmission line periodically even before communication between the OLT and the ONU is opened. Further, whether the control frame is transmitted by the OLT or the ONU can be determined on the basis of the type of the control frame. Since the unique information of the transmission source is contained in the control frame, the unique information of the OLT or the ONU can be acquired by detecting the information. The acquisition of the unique information of the OLT or the ONU enables the coated optical fiber to be identified by comparing the acquired unique information with a list which is managed in a separate database or the like and in which the unique information of the OLT or the ONU is associated with coated optical fiber information.

Accordingly, the present invention can provide a communication monitoring method and a communication monitoring apparatus capable of an operation of identifying a coated optical fiber regardless of a propagation direction of an optical signal even before communication between an OLT and an ONU is opened.

Herein, the received signal is determined to be the downlink optical signal when the signal type is a Gate frame or a Register frame, and the received signal is determined to be the uplink optical signal when the signal type is a Report frame, a Register Request frame, or a Register ACK frame. The unique information is a MAC address.

In the communication monitoring method according to the present invention, the unique information of the transmission source is compared with a list in which at least one of the unique information of the OLT or the unique information of the ONU is associated with information of a plurality of coated optical fibers included in the optical fiber transmission line, so that one of the plurality of coated optical fibers through which the received optical signal propagates is identified.

The communication monitoring apparatus according to the present invention further includes:

a list in which at least one of the unique information of the OLT or the unique information of the ONU is associated with information of a plurality of coated optical fibers included in the optical fiber transmission line; and a coated optical fiber identification unit configured to identify one of the plurality of coated optical fibers through which the received optical signal propagates by comparing the unique information of the transmission source with the list.

Incidentally, the single or two optical signal detection units of the communication monitoring apparatus according to the present invention may be two optical signal detection units. One of the optical signal detection units may be connected to a first port of an optical branch unit disposed in the optical fiber transmission line, the first port being configured to allow the downlink optical signal to be output therefrom, and another of the optical signal detection units is connected to a second port of the optical branch unit, the second port being configured to allow the uplink optical signal to be output therefrom.

On the other hand, the single or two optical signal detection units of the communication monitoring apparatus according to the present invention may be a single optical signal detection unit, the single optical signal detection unit being connected to a first port or a second port of an optical branch unit disposed in the optical fiber transmission line, the first port being configured to allow the downlink optical signal to be output therefrom, the second port being configured to allow the uplink optical signal to be output therefrom.

The inventions described above can be combined with each other to the extent possible.

Effects of the Invention

The present invention can provide a communication monitoring method and a communication monitoring apparatus capable of an operation of identifying a coated optical fiber regardless of the propagation direction of an optical signal even before communication between an OLT and an ONU is opened.

DESCRIPTION OF EMBODIMENTS

Embodiments of the present invention will be described with reference to the accompanying drawings. The embodiments described below are examples of the present invention and the present invention is not limited to the embodiments described below. In the present specification and the drawings, components with the same reference signs indicate the same components.

Figure 1:
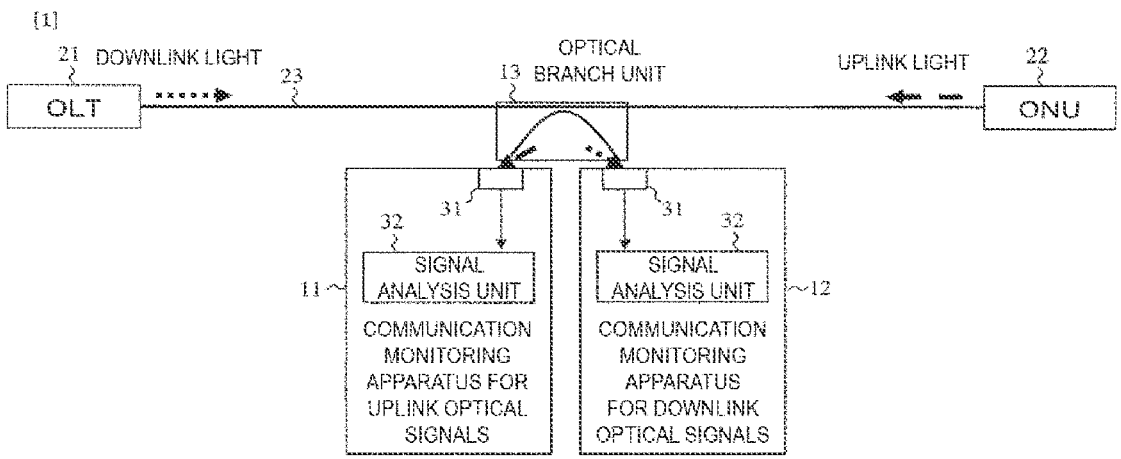
FIG. 1 is a diagram illustrating a configuration in which coated optical fiber identification is performed using communication monitoring apparatuses for uplink and downlink.
Figure 2:
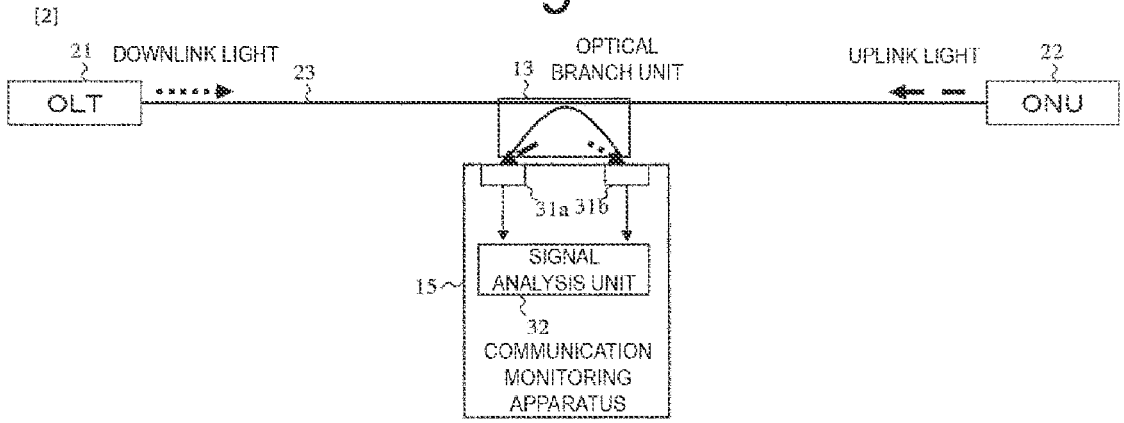
FIG. 2 is a diagram illustrating a communication monitoring apparatus according to an embodiment of the present invention.

FIG. 2 is a diagram illustrating a communication monitoring apparatus 15 according to the present embodiment. The communication monitoring apparatus 15 is a communication monitoring apparatus which monitors communication between an OLT 21 and a plurality of ONUs 22 connected via an optical fiber transmission line 23. The communication monitoring apparatus 15 includes an optical signal detection unit 31 and a signal analysis unit 32. The optical signal detection unit 31 receives at least one of a downlink optical signal transmitted from the OLT 21 or an uplink optical signal transmitted from the ONU 22 as a received signal. The signal analysis unit 32 detects a signal type and unique information of a transmission source from information included in the received signal and determines whether the received signal is a downlink optical signal or an uplink optical signal on the basis of the signal type. Further, the signal analysis unit 32 determines that the unique information of the transmission source is unique information of the OLT when the received signal is a downlink optical signal and determines that the unique information of the transmission source is unique information of the ONU when the received signal is an uplink optical signal.

In the present embodiment, a case is described in which two optical signal detection units 31 are provided. One optical signal detection unit 31a is connected to a port of an optical branch unit disposed in the optical fiber transmission line, from which the downlink optical signal is output, and the other optical signal detection unit 31b is connected to a port of the optical branch unit, from which the uplink optical signal is output.

Incidentally, one optical signal detection unit 31 may be provided to be connected to a port of the optical branch unit 13 disposed in the optical fiber transmission line 23, from which the downlink optical signal is output, or to another port of the optical branch unit 13, from which the uplink optical signal is output.

Figure 4:
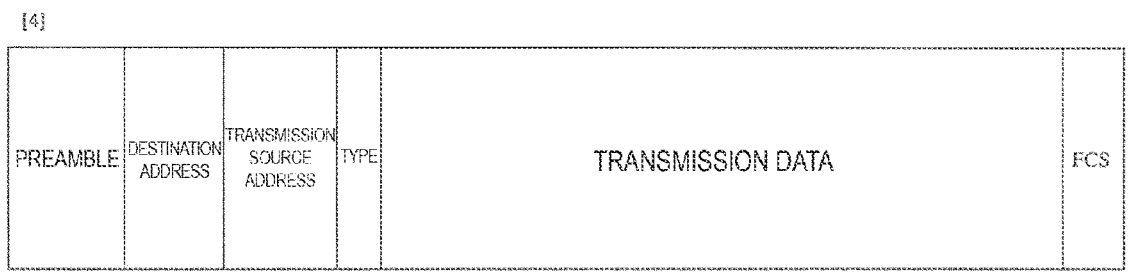
FIG. 4 is a diagram illustrating an Ethernet (trade name) frame.

The communication monitoring apparatus 15 receives an optical signal output from each port of the optical branch unit 13, determines whether the signal is an uplink optical signal or a downlink optical signal, and acquires unique information of the OLT 21 or the ONU 22 from the optical signal. FIG. 4 is a diagram illustrating an example of the optical signal propagating through the optical fiber transmission line 23. In the present example, an Ethernet frame is used as the optical signal.

The optical signal detection units (31a and 31b) can detect an uplink optical wavelength of 1260 to 1360 nm and a downlink optical wavelength of 1480 to 1500 nm so that both of the uplink/downlink optical signals can be received. The optical signal detection units (31a and 31b) convert the received optical signal into an electrical signal and transmits the electrical signal to the signal analysis unit 32.

The signal analysis unit 32 receives the electrical signal from the optical signal detection units (31a and 31b), detects a signal for control from the electrical signal regardless of the uplink and the downlink, and acquires the unique information of the transmission source. For example, in the case of GE-PON, the optical signal is an Ethernet frame such as that illustrated in FIG. 4 (for example, see Non Patent Literature 1). In this case, the unique value of the transmission source is the MAC address of the transmission source.

The signal analysis unit 32 can determine whether the optical signal is a control frame or a communication frame (telephone or IP communication) in accordance with the value stored in a "type" field in the frame. Further, on the basis of a value stored in two bytes after the "type" field in the frame, the signal analysis unit 32 determines whether the control frame is, a Gate frame, a Register frame, a Report frame, a Register Request frame, or a Register ACK frame.

Then, when the control frame is a Gate frame or a Register frame, the signal analysis unit 32 can identify the control frame as a downlink control frame and the acquired transmission source MAC address as the MAC address of the OLT 21. On the other hand, when the control frame is a Report frame, a Register Request frame, or a Register ACK frame, the signal analysis unit 32 can identify the control frame as an uplink control frame and the acquired transmission source MAC address as the MAC address of the ONU 22.

Figure 3:
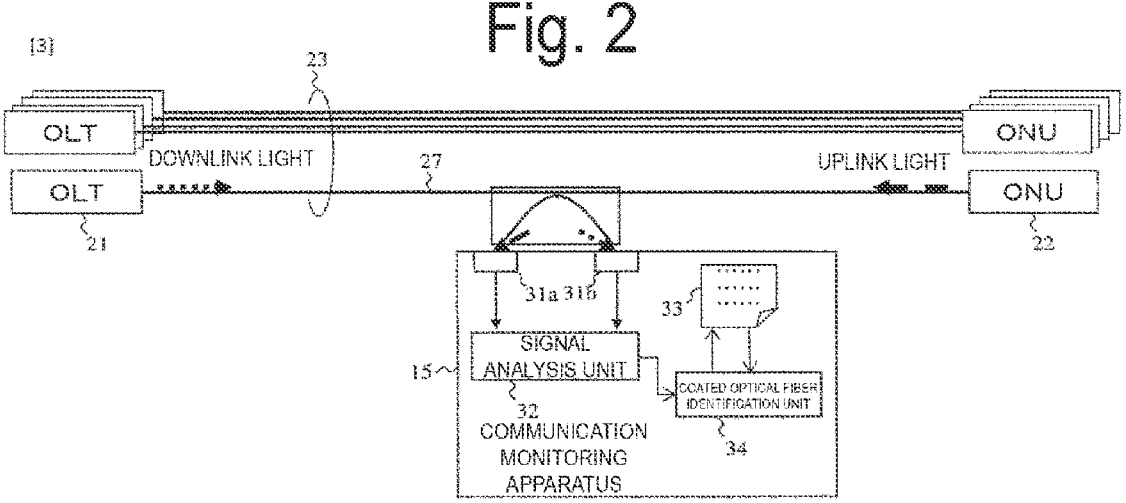
FIG. 3 is a diagram illustrating a configuration in which coated optical fiber identification is performed using the communication monitoring apparatus according to the embodiment of the present invention.

FIG. 3 is a diagram illustrating an operation of identifying a coated optical fiber performed by the communication monitoring apparatus 15. The communication monitoring apparatus 15 further includes a list 33 and a coated optical fiber identification unit 34. In the list 33, at least one of the unique information of the OLT 21 or the unique information of the ONU 22 is associated with information of a plurality of coated optical fibers 27 included in the optical fiber transmission line 23. The coated optical fiber identification unit 34 compares the unique information of the transmission source with the list 33 and identifies one of the coated optical fibers 27 through which the received optical signal propagates.

In actual equipment, as illustrated in FIG. 3, the plurality of coated optical fibers 27 each connecting the OLT 21 and the ON U 22 are housed in the cable of the same optical fiber transmission line. In order to identify one of the coated optical fibers 27 on which an operation is to be operated, for example, an operator bends the coated optical fiber 27 to leak at least one of the downlink optical signal of the OLT 21 or the uplink optical signal of the ONU 22 and acquires the MAC address by the communication monitoring apparatus 15.

In the communication monitoring apparatus 15, the coated optical fiber identification unit 34 identifies the coated optical fiber 27 by comparing the acquired MAC address with the list 33 which is managed in a separate database or the like and in which the MAC address is associated with the coated optical fiber information.

In the related art, the coated optical fiber 27 is identified on the basis of only the MAC address of the ONU 22. For example, coated optical fiber identification cannot be performed in a case where uplink light is not transmitted from the ONU 22, a case where the ONU 22 is not connected to the coated optical fiber 27, or a case where new communication with the ONU 22 is opened.

On the other hand, the communication monitoring apparatus 15 compares the MAC addresses of both the OLT 21 and the ONU 22, and, even in the cases described above, can perform the coated optical fiber identification by acquiring the MAC address of the OLT from the downlink optical signal and comparing the MAC address with the list 33.

REFERENCE SIGNS LIST

11 Communication monitoring apparatus for uplink optical signals
12 Communication monitoring apparatus for downlink optical signals
13 Optical branch unit
15 Communication monitoring apparatus
21 OLT
22 ONU
23 Optical fiber transmission line
27 Coated optical fiber
31, 31a, 31b Optical signal detection unit
32 Signal analysis unit
33 List
34 Coated optical fiber identification unit

The invention claimed is:

1. A communication monitoring method of monitoring communication between an optical line terminal (OLT) and a plurality of optical network units (ONUs) connected via an optical fiber transmission line, the method comprising:
   receiving, as a received signal, at least one of a downlink optical signal transmitted from the OLT or an uplink optical signal transmitted from each of the plurality of ONUs;
   detecting a signal type and unique information of a transmission source from information included in the received signal;
   determining whether the received signal is the downlink optical signal or the uplink optical signal based on the signal type; and
   determining that the unique information of the transmission source is unique information of the OLT when the received signal is the downlink optical signal and that the unique information of the transmission source is unique information of the ONU when the received signal is the uplink optical signal.

2. The communication monitoring method according to claim 1,
   wherein the received signal is determined to be the downlink optical signal when the signal type is a Gate frame or a Register frame, and the received signal is determined to be the uplink optical signal when the signal type is a Report frame, a Register Request frame, or a Register ACK frame.

3. The communication monitoring method according to claim 1,
   wherein the unique information is a MAC address.

4. The communication monitoring method according to claim 1,
   wherein the unique information of the transmission source is compared with a list in which at least one of the unique information of the OLT or the unique information of the ONU is associated with information of a plurality of coated optical fibers included in the optical fiber transmission line, so that one of the plurality of coated optical fibers through which the received optical signal propagates is identified.

5. A communication monitoring apparatus configured to monitor communication between an optical line terminal (OLT) and a plurality of optical network units (ONUs) connected via an optical fiber transmission line, the apparatus comprising:
   a single or two optical signal detection units, including one or more processors, configured to receive, as a received signal, at least one of a downlink optical signal transmitted from the OLT or an uplink optical signal transmitted from each of the plurality of ONUs; and
   a signal analysis unit including one or more processors, configured to:
      detect a signal type and unique information of a transmission source from information included in the received signal;
      determine whether the received signal is the downlink optical signal or the uplink optical signal based on the signal type; and
      determine that the unique information of the transmission source is unique information of the OLT when the received signal is the downlink optical signal and that the unique information of the transmission source is unique information of the ONU when the received signal is the uplink optical signal.

6. The communication monitoring apparatus according to claim 5,
   wherein the single or two optical signal detection units are two optical signal detection units,
   one of the optical signal detection units is connected to a first port of an optical branch unit disposed in the optical fiber transmission line, the first port being configured to allow the downlink optical signal to be output therefrom, and
   another of the optical signal detection units is connected to a second port of the optical branch unit, the second port being configured to allow the uplink optical signal to be output therefrom.

7. The communication monitoring apparatus according to claim 5,
   wherein the single or two optical signal detection units are a single optical signal detection unit, the single optical signal detection unit being connected to a first port or a second port of an optical branch unit disposed in the optical fiber transmission line, the first port being configured to allow the downlink optical signal to be output therefrom, the second port being configured to allow the uplink optical signal to be output therefrom.

8. The communication monitoring apparatus according to claim 5, the apparatus further comprising:
   a list in which at least one of the unique information of the OLT or the unique information of the ONU is associated with information of a plurality of coated optical fibers included in the optical fiber transmission line; and
   a coated optical fiber identification unit including one or more processors, configured to identify one of the plurality of coated optical fibers through which the received optical signal propagates by comparing the unique information of the transmission source with the list.

* * * * *